United States Patent Office 3,452,111
Patented June 24, 1969

3,452,111
STABILIZATION OF SECONDARY
ALKYLLITHIUMS
Conrad W. Kamienski, Knoxville, Tenn., and Ricardo O. Bach, Gastonia, and William S. Leonhardt, Bessemer City, N.C., assignors to Lithium Corporation of America, Inc., New York, N.Y., a corporation of Minnesota
No Drawing. Filed Dec. 9, 1966, Ser. No. 600,356
Int. Cl. C07f 1/02
U.S. Cl. 260—665                   8 Claims

ABSTRACT OF THE DISCLOSURE

Compositions comprising a heat labile secondary alkyllithium, such as sec-butyllithium, in admixture with a stabilizing amount of one or more of isopropyllithium and n-butyllithium.

---

Our invention is directed to the stabilization of secondary alkyllithiums, and it especially is concerned with the stabilization of solutions of sec-butyllithium, in organic solvents towards which sec-butyllithium is generally inert. The invention will be described below in reference particularly to the stabilization of sec-butyllithium, but it will be understood that it is applicable to the stabilization of other secondary alkyllithiums which are heat labile.

Sec.-butyllithium is used for a number of purposes in industry, including use as a catalyst in certain polymerization reactions such as the polymerization of conjugated dienes. It is subject to appreciable decomposition over a period of time, and this is particularly so at slightly elevated temperatures. While it is essentially completely miscible with hydrocarbon sovents such as hexane, it is commonly marketed in the form of an approximately 10 to 15 weight percent solution in hexane or other organic solvent with respect to which it is relatively inert. In such form, and in other forms as well, it decomposes, commonly suffering an active butyllithium loss in excess of 5% over a period of 3 to 4 weeks at room temperature and in excess of 30% at 42 degrees C.

We have discovered that the stability against decomposition of heat labile secondary alkyllithiums is effectively enhanced by admixing therewith isopropyllithium or n-butyllithium. The stabilizing functioning of isopropyllithium may be illustrated by way of example, by noting that the rate of decomposition of a 13 weight percent solution in hexane of sec-butyllithium and isopropyllithium in a molar ratio of 1:1 was found to be (a) approximately one-fifth of the rate of decomposition of a 12 weight percent solution of sec-butyllithium in hexane, and (b) approximately the same as an isopropyllithium solution (of the same concentration) above.

Further tests were run which illustrate the nature and advantages of our invention. Thus, using 1-liter stainless steel heavy-walled cylinders equipped with two valves, one of said valves being connected to a stainless steel tube running to the bottom of the cylinder for sample withdrawal, and the other valve being connected to a source of inert gas for the purpose of pressuring out samples, each of the following solutions was placed in a separate cylinder.

(1) 700 cc. of a 1.21 molar solution of sec-butyllithium in hexane.

(2) 700 cc. of a 1.21 molar solution of sec-butyllithium in hexane to which was added 77 grams of a 1.35 molar solution of di-sec-butyl magnesium in hexane (2.5 weight percent on sec-butyllithium).

(3) 525 cc. of a 121 molar solution of sec-butyllithium (0.75 moles) in hexane and 175 cc. of a 1.21 molar solution of n-butyllithium (0.25 moles) in hexane.

(4) 300 cc. of a 1.49 molar solution of isopropyllithium in equal parts by volume of pentane and hexane.

(5) 700 cc. of a 13% weight solution of a mixture of sec-butyllithium and isopropyllithium in a 1:1 molar ratio.

By standard oxidimetric procedures, measurements were made at specified intervals during a 27 day period, at 42 degrees C. to determine the extent of decomposition of the alkyllithium involved. The results are expressed below in Table I in terms of weight percent of active alkyl lost as sec-butyllithium.

TABLE I

| Compound | Active alkyl, wt. percent original | 7 days | 16 days | 27 days |
|---|---|---|---|---|
| (1) Sec-BuLi | 12.0 | 10.75 | 9.7 | 7.7 |
| (2) Sec-BuLi/di-sec-BuMg | 12.0 | 10.1 | 7.9 | 4.4 |
| (3) Sec-BuLi/n-BuLi | 12.0 | 11.3 | 9.8 | 9.3 |
| (4) Isopropyl Li | 11.2 | [1] 10.9 | [2] 10.5 | 10.5 |
| (5) Isopropyl Li/sec-BuLi | 13.1 | 13.0 | 12.4 | 12.1 |

The foregoing data led to the following results as set forth below in Table II.

TABLE II

| Compound | Original | Percent loss of active alkyl | | |
|---|---|---|---|---|
| | | 7 days | 16 days | 27 days |
| (1) Sec-BuLi | 0 | 10.4 | 17.5 | 35.8 |
| (2) Sec-BuLi/di-sec-BuMg | 0 | 15.8 | 34.2 | 63.3 |
| (3) Sec-BuLi/n-BuLi | 0 | 5.8 | 18.3 | 22.5 |
| (4) Isopropyl Li | 0 | [1] 2.7 | [2] 6.2 | 6.2 |
| (5) Isopropyl Li/sec-BuLi | 0 | 0.8 | 5.3 | 7.6 |

[1] 6 days.  [2] 13 days.

The percent loss of active alkyl in the isopropyllithium solution was calculated as isopropyllithium lost.

While the invention is especially applicable to the stabilization of sec-butyllithium, and particularly by means of isopropyllithium, it is, as noted above, also applicable to the stabilization of other heat labile secondary alkyllithiums, notably those containing from 4 to 8 carbon atoms in the alkyl radicals as, for instance, sec-amyllithium, sec-hexyllithium, cyclohexyllithium, and sec-octyllithium.

The quantity of isopropyllithium, or n-butyllithium, utilized is variable, depending upon the extent of stabilization and upon the selection of which of said stabilizing alkyllithiums is used. In general, in terms of molar proportions, the isopropyllithium or the n-butyllithium will commonly be used in amounts of the general order of 0.5 to 1.2 moles per mole of sec-butyllithium or other secondary alkyllithium, but somewhat lower as well as somewhat higher molar ratios can be used.

The stabilized secondary alkyllithiums of the present invention are most desirably produced in the form of solutions in organic solvents which are substantially inert towards alkyllithiums. Saturated aliphatic hydrocarbons are very satisfactory, illustrative examples of which are pentane, hexane, octane and iso-octane. Such aromatic hydrocarbons as benzene, toluene and the like can also be used. Particularly satisfactory are pentane and hexane or mixtures thereof. The concentrations of the alkyllithiums in the organic solvent solutions are variable within wide limits being dependent, among other things, upon the solubilities of the secondary alkyllithium and the aforesaid stabilizing alkyllithium in the particular organic solvent utilized. Generally speaking, it is convenient to prepare compositions in which the concentration of the mixture of said alkyllithiums is in the range of about 10 to about 15 weight percent, although much higher concentrations or, indeed, much lower concentrations can be prepared if desired for any particular purpose.

Mixtures of two or more secondary alkyllithiums and mixtures of the isopropyllithium and n-butyllithium can be used, if desired, but ordinarily there is no particular advantage in doing so.

We claim:
1. A composition comprising a heat labile secondary alkyllithium in admixture with a stabilizing amount of one or more of isopropyllithium and n-butyllithium.
2. A composition according to claim 1, in which the ingredients are dissolved in a substantially inert organic solvent.
3. A composition according to claim 1, in which the secondary alkyllithium is sec-butyllithium.
4. A composition according to claim 2, in which the secondary alkyllithium is sec-butyllithium, and in which the stabilizing alkyllithium is isopropyllithium.
5. A composition according to claim 4, in which the sec-butyllithium and the isopropyllithium are present in substantially equal molar ratios.
6. A composition according to claim 4, in which the total concentration of the sec-butyllithium and the isopropyllithium in the organic solvent solution is about 10 to about 15 weight percent.
7. A composition according to claim 5, in which the organic solvent is a normally liquid hydrocarbon.
8. A composition according to claim 7, in which the organic solvent is pentane or hexane or mixtures thereof.

References Cited

UNITED STATES PATENTS

| | | | |
|---|---|---|---|
| 3,087,896 | 4/1963 | Kamienski et al. | 252—192 |
| 3,155,736 | 11/1964 | Beumel | 260—665 |

TOBIAS E. LEVOW, *Primary Examiner.*

A. P. DEMERS, *Assistant Examiner.*

U.S. Cl. X.R.

252—400, 431; 260—94.2